(12) United States Patent
Konya et al.

(10) Patent No.: US 11,674,569 B2
(45) Date of Patent: Jun. 13, 2023

(54) TOOTHED BELT COMPRISING RUNNING SURFACES PROVIDED ON OPPOSITE SIDES AND HAVING TOOTH SYSTEMS, THE HELIX ANGLES OF THE TOOTH SYSTEMS BEING ORIENTED IN OPPOSITE DIRECTIONS, AND ASSOCIATED TOOTHED BELT GEAR

(71) Applicant: ContiTech Antriebssysteme GmbH, Hannover (DE)

(72) Inventors: Alexander Konya, Hannover (DE); Thomas Melz, Hannover (DE); Peter Marx, Wasbüttel (DE); Mirko Traue, Braunschweig (DE); Thomas Knopp, Vechelde (DE); Ernst Wilske, Nedlitz (DE); Eberhard Rulf, Bornstedt (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 163 days.

(21) Appl. No.: 17/253,069

(22) PCT Filed: Jun. 18, 2019

(86) PCT No.: PCT/EP2019/065931
§ 371 (c)(1),
(2) Date: Dec. 16, 2020

(87) PCT Pub. No.: WO2020/007599
PCT Pub. Date: Jan. 9, 2020

(65) Prior Publication Data
US 2021/0131535 A1 May 6, 2021

(30) Foreign Application Priority Data

Jul. 5, 2018 (DE) ...................... 10 2018 116 331.2

(51) Int. Cl.
*F16H 9/26* (2006.01)
*F16G 1/28* (2006.01)

(52) U.S. Cl.
CPC ...... *F16H 9/26* (2013.01); *F16G 1/28* (2013.01)

(58) Field of Classification Search
CPC ....... F16H 9/26; F16H 2001/2881; F16G 1/28
See application file for complete search history.

(56) References Cited

U.S. PATENT DOCUMENTS

| 5,954,611 A | 9/1999 | Mills et al. |
| 9,441,712 B1 * | 9/2016 | Tjensvoll ................ F03D 15/00 |
| 2018/0208435 A1 | 7/2018 | Pelto-Huikko |

FOREIGN PATENT DOCUMENTS

| CN | 106352034 A | 1/2017 |
| CN | 108137279 A | 6/2018 |
| DE | 19611589 A1 | 10/1996 |

(Continued)

*Primary Examiner* — Justin Holmes

(57) ABSTRACT

The invention relates to a toothed belt (10a, 10b) with two mutually oppositely arranged running surfaces (2, 4), wherein, on the running surfaces (2, 4), there are arranged toothings (12, 14) arranged obliquely with respect to the axial direction (X), wherein the obliquity is defined in each case by helix angles (16, 18) between the axial direction (X) and the direction of the tooth flanks of the respective toothings (12, 14). It is provided that the helix angle (16) of the first toothing (12) is oriented oppositely to the helix angle (18) of the second toothing (14).

12 Claims, 8 Drawing Sheets

(56) References Cited

FOREIGN PATENT DOCUMENTS

Figure 1:
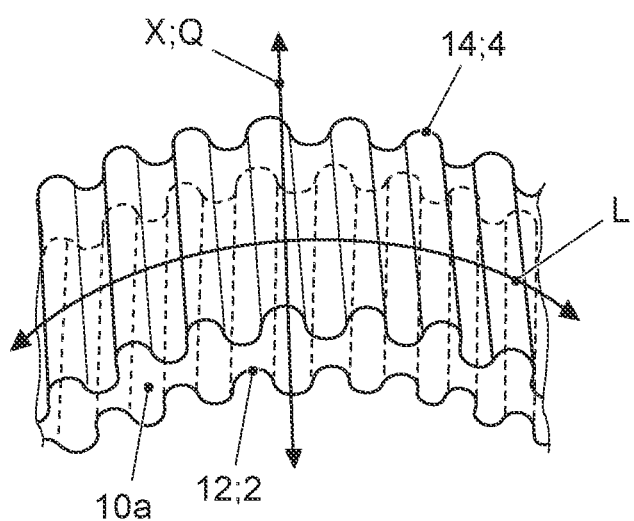

| | | | |
|---|---|---|---|
| DE | 19731004 A1 * | 1/1999 | ............... F16H 9/26 |
| DE | 102005055730 A1 | 6/2007 | |
| DE | 102009014925 A1 | 12/2010 | |
| DE | 102011009165 A1 | 7/2011 | |
| DE | 102016006444 A1 * | 9/2017 | |
| EP | 2354593 A1 | 8/2011 | |
| FR | 2547382 A1 | 12/1984 | |
| JP | 2002039277 A * | 2/2002 | |
| JP | 2002039277 A | 2/2002 | |
| JP | 2014159818 A | 9/2014 | |
| JP | 2016186313 A | 10/2016 | |
| WO | 9904184 A1 | 1/1999 | |
| WO | WO-0063588 A1 * | 10/2000 | ............... F16H 1/46 |
| WO | 2010108467 A1 | 9/2010 | |
| WO | 2017164135 A1 | 9/2017 | |

* cited by examiner

TOOTHED BELT COMPRISING RUNNING SURFACES PROVIDED ON OPPOSITE SIDES AND HAVING TOOTH SYSTEMS, THE HELIX ANGLES OF THE TOOTH SYSTEMS BEING ORIENTED IN OPPOSITE DIRECTIONS, AND ASSOCIATED TOOTHED BELT GEAR

The invention relates to a double-sided toothed belt, to a toothed-belt transmission having a double-sided toothed belt, and to a transmission arrangement having two toothed-belt transmissions formed as planetary transmissions with double-sided toothed belts.

Toothed belts and associated toothed-belt transmissions are known in a variety of embodiments.

The document DE 10 2005 055 730 A1 discloses a toothed-belt transmission, in particular for a servo steering system of a vehicle, having a toothed belt. It is provided that the toothed belt can be placed in meshing engagement with a first toothed-belt pulley and with a second toothed-belt pulley, and the rear side of the toothed belt has an irregular toothing.

The document DE 10 2009 014 925 A1 has disclosed a toothed-belt transmission with a toothed belt, wherein the helix angle of the teeth on the toothed-belt pulley is increased by up to 1.0 degrees, preferably by up to 0.5 degrees, in relation to the helix angle of the teeth on the toothed belt.

The document DE 10 2011 009 165 A1 discloses a transmission which provides, inter alia, a first and a second, in each case doubly toothed toothed belt, wherein the toothed belts are in engagement with at least one coupled toothed-belt pulley pair and, with the two toothed-belt pulley pairs, correspondingly form two mutually adjacently arranged toothed-belt transmissions. Here, the at least one coupled toothed-belt pulley pair rotates within two toothed-belt pulleys which are each formed as an internal gear and into which the toothed belts, which are toothed on both sides, engage.

The invention is now based on the object of providing a toothed belt with two mutually oppositely arranged toothings, in the case of which, during operation, the force distribution of the forces acting on the toothed belt is improved. In particular, no transverse forces (forces in an axial direction) should arise.

Furthermore, it is the intention for running smoothness to be increased, and for wear to be reduced. At the same time, it is the intention for toothed-belt transmissions formed with such toothed belts to be of simple and space-saving construction and producible inexpensively.

A starting point of the invention is a toothed belt with two toothings arranged on mutually opposite sides (top side and bottom side). The toothed belt to which the invention relates has a running surface on each side, that is to say two running surfaces, wherein preferably an inner running surface (bottom side) and an outer running surface (top side) are formed.

The two running surfaces are each provided with toothings, wherein the toothings are oriented obliquely with respect to the axial direction.

Here, the axial direction defines the direction of the shafts of the toothed-belt pulleys with which the toothed belt according to the invention interacts. In the case of a toothed belt without obliquity of the toothing, the helix angle relative to the shaft axis is zero.

Here, the teeth of the toothing run parallel to the axial direction, which is defined as the X direction of the shafts of the associated transmission. The running direction of a toothed belt in operation is thus oriented orthogonally with respect to the axial direction. In other words, the axial direction runs orthogonally, that is to say transversely with respect to the running direction.

The power transmission by means of a toothed belt with helical toothing advantageously has a damping action and exhibits no play.

The oblique toothings thus advantageously ensure increased running smoothness and correspondingly lower noise emissions.

It is provided according to the invention that, in relation to an axial direction, which is transverse with respect to the running direction, of the toothed belt, the helix angle of the first toothing is oriented oppositely to the helix angle of the second toothing of the toothed belt.

Here, as already mentioned, the specification of the helix angle is in relation to the axial direction. Specifically, the helix angle indicates in each case the angle enclosed by the tooth flanks of the toothing and the axial direction.

The concept of the invention provides that the helix angle of the first toothing is oriented in a first direction and the helix angle of the second toothing is oriented oppositely to the helix angle of the first toothing.

In other words, the helix angle of the first toothing is oriented oppositely to the helix angle of the second toothing.

In other words again, in the case of an equal magnitude of the two helix angles, the helix angle of the second toothing arises from a "mirroring" of the helix angle of the first toothing either about the X direction orientation or else about the running direction orientation.

In the case of equal forces on both toothings, the transverse forces acting in an axial direction of the toothed belt, which result from the oblique profile of the tooth flanks of the two oppositely oriented toothings, advantageously cancel one another out.

Owing to the helical teeth of toothed belts and toothed-belt pulleys, a stabilization of the engagement is realized.

The oblique toothings thus advantageously ensure increased running smoothness and correspondingly lower noise emissions.

Owing to the oppositely oriented obliquities, according to the invention, of the two mutually oppositely arranged toothings, the transverse forces acting in an axial direction on the toothed belt advantageously cancel one another out. Accordingly, the toothed belt also does not move in an axial direction, such as is the case with conventional toothed belts with identically oriented obliquity of the toothings on both sides.

It is thus advantageously the case that no rim disks arranged to the sides of the toothed belt on the toothed-belt pulleys are required for preventing axial migration of the toothed belt.

There is advantageously thus no friction against the rim disks and accordingly also no wear of the toothed belt against the rim disks, as can be observed in the case of conventional toothed belts with helical toothing.

Owing to the advantageous avoidance of friction against the rim disks, the mechanical losses are advantageously reduced by means of the solution that has been found. Accordingly, the friction-induced transmission temperatures are reduced, and thus the thermal loads on the components of the associated transmission are reduced.

The known advantages of helical toothings have hitherto always been linked with the disadvantage that transverse forces acted on the toothed belts, which transverse forces led to a sideward movement and thus necessitated the arrangement of rim disks. By means of the solution that has been found, it is possible for the first time to solve this problem in a manner which is advantageous from all aspects. It is thus possible to utilize the advantages of helical toothings in correspondingly designed transmissions without having to accept hitherto existing disadvantages.

According to one advantageous configuration of the invention, it is provided that the oppositely oriented helix angles of the first toothing and of the second toothing have an equal or different magnitude of the helix angle. The forces acting on the tooth flanks, with regard to the transverse forces that arise from the different radius at the inside and at the outside from the thickness of the toothed belt, can be compensated by means of a different magnitude of the helix angle of the two mutually opposite toothings.

In a further preferred configuration of the invention, it is provided that the helix angles of the two toothings of the toothed belt preferably have an angle between >0 degrees and 20 degrees. By means of the stated range of the orientation of the toothing, the advantages of the reduction in noise and wear are advantageously achieved whilst simultaneously allowing for other demands on toothed belts, such as tensile strength, little stretching and aspects of manufacturing technology.

In a further preferred configuration of the invention, it is provided that the helix angles of the two toothings of the toothed belt particularly preferably have an angle of 2 to 10 degrees. The stated angle range between 2 and 10 degrees constitutes an optimized range with regard to the demands on toothed belts according to the invention.

In a further preferred configuration of the invention, it is provided that the toothings of the toothed belt are of similar or non-similar design in particular with regard to tooth height, tooth pitch (tooth spacing) and tooth shape.

For this purpose, the engagement between toothed-belt pulley and toothing of a toothed belt must be configured such that a tooth spacing Z in relation to the toothed-belt width B is slightly smaller than the tangent of the helix angle of the helically toothed belt.

Figure 2:
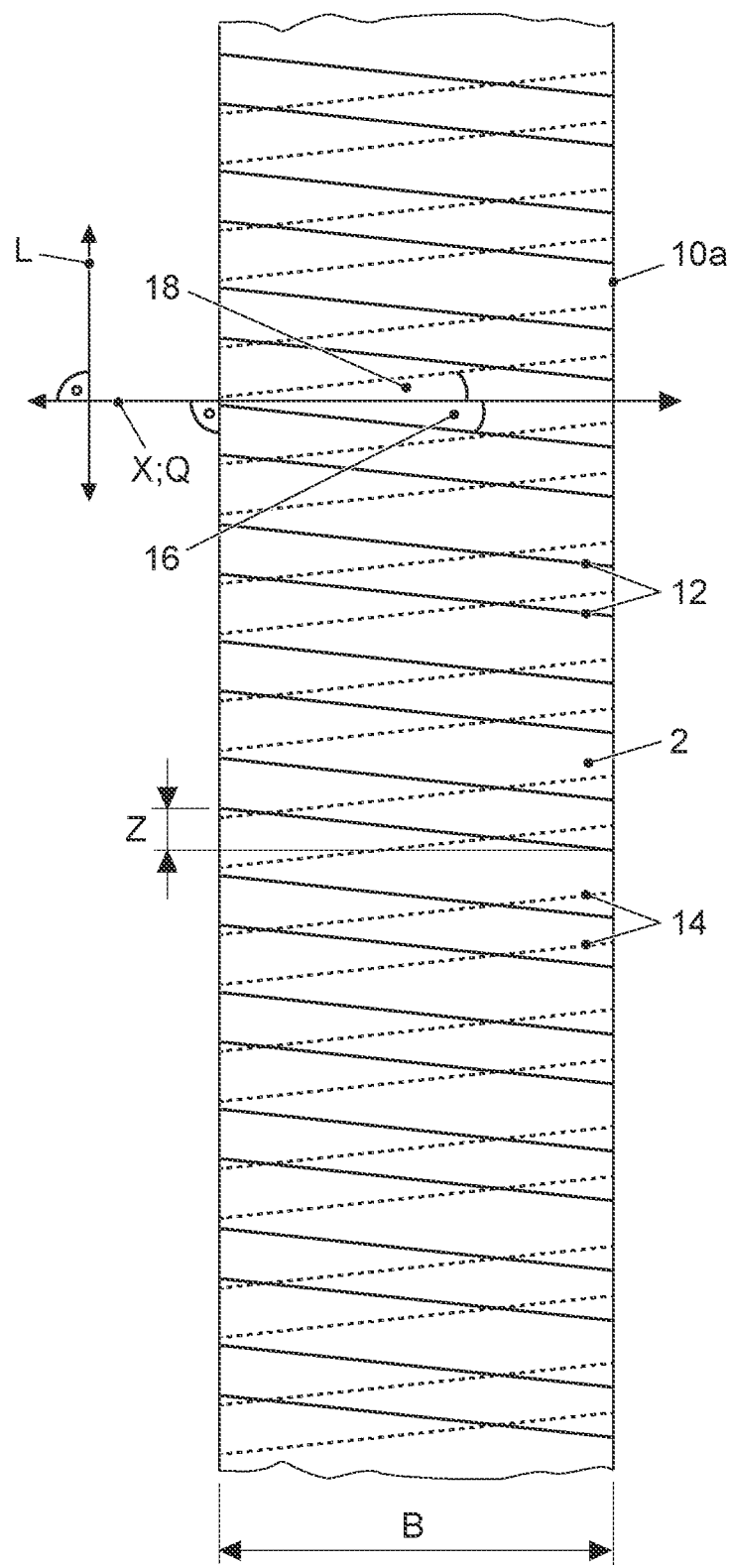

For the ascertainment of the tangent, the opposite side is the spacing between the start of meshing engagement in a running direction L at one edge of the toothed belt to the tooth exit point at the opposite edge of the toothed belt, and the adjacent side is the toothed-belt width B of the toothed belt (see FIG. 2).

Tooth spacing Z and toothed-belt width B are preferably selected such that a preferred helix angle of the toothed belt of 5 degrees is attained.

According to the invention, toothed belts are provided which allow a coupling of different toothed-belt pulleys, insofar as they interact with the different toothings of the toothed belt. At the same time, the toothed belt can, if necessary, be adapted to different demands at the two running surfaces.

The invention furthermore relates to a toothed-belt transmission with oblique toothings of the toothed belt on both sides in relation to the axial direction orthogonal to the running direction, and with the toothed-belt pulleys which interact with the toothed belt.

It is provided according to the invention that the toothed-belt transmission has a toothed belt and at least one first toothed-belt pulley, which is in engagement with the first toothing of the toothed belt, and at least one second toothed-belt pulley, which is in engagement with the second toothing of the toothed belt.

It is provided according to the invention that the obliquity of the teeth of the respective toothed-belt pulley corresponds to the obliquity of the respective toothing of the toothed belt.

The invention thus provides a toothed-belt transmission which comprises a toothed belt according to the invention, wherein at least two toothed-belt pulleys interact with the at least one toothed belt.

The advantages mentioned with regard to the toothed belt thus also apply to the associated toothed-belt transmission.

The toothed-belt transmission according to the invention can advantageously be implemented so as to be somewhat smaller and of lower weight, in particular owing to the omission of rim disks. The outlay in terms of assembly for the toothed-belt transmission according to the invention is advantageously reduced in relation to conventional helically toothed toothed-belt transmissions.

In a preferred configuration of the invention, it is provided that the second toothed-belt pulley is arranged opposite the first toothed-belt pulley.

The toothed belt thus runs between the two toothed-belt pulleys and serves for play-free transmission with simultaneous damping and noise reduction.

This oppositely situated arrangement of the two toothed-belt pulleys ensures that the transverse forces act directly oppositely on the toothed belt arranged between the two toothed-belt pulleys, and thus cancel one another out in the contact region of toothed belt and the two toothed-belt pulleys.

In a particularly preferred configuration of the invention, it is provided that the spacing between the first toothed-belt pulley and the second toothed-belt pulley is smaller than the thickness of the toothed belt.

The transmitting toothed belt is arranged in the intermediate space, defined by the spacing, between the mutually oppositely situated first and second toothed-belt pulleys.

The elastic toothed belt is compressed by an intermediate space which has an undersize in relation to the toothed belt. A contact pressure is thus attained which further reduces the noise emissions and the wear of the toothed-belt transmission.

In a further preferred configuration of the invention, it is provided that the at least one first toothed-belt pulley has an external toothing—as spur gear—and the second toothed-belt pulley is formed with an internal toothing—as internal gear.

In a preferred configuration of the invention, the teeth of the internal gear and planet gear are furthermore preloaded against one another, because the toothed belt that is arranged between internal gear and planet gear is flexible.

Thus, by means of the advantageous refinement of the invention, a toothed-belt transmission is provided in the case of which the external toothing according to the invention of the first toothed-belt pulley interacts via the toothed belt with the internal toothing according to the invention of the second internally toothed toothed-belt pulley.

By means of this arrangement, the noise emissions of the toothed-belt transmission are minimized.

With this configuration of the toothed belt drive, it is furthermore advantageously the case that the prerequisites for the configuration of a planetary transmission which has the advantages according to the invention discussed in more detail further below are provided.

In a further preferred configuration of the invention, it is thus provided that the toothed-belt transmission is formed as a planetary transmission.

For this purpose, the first toothed-belt pulleys—the spur gears formed as planet gears—are arranged or mounted rotatably relative to one another in a planet carrier.

The rotatable planet carrier is arranged within the second toothed-belt pulley formed as a static internal gear, wherein the first toothed-belt pulleys, formed as spur gears/planet gears, are in engagement with the first toothing of the toothed belt, and the internal gear is in engagement, in regions situated in each case opposite the first toothed-belt pulleys, with the second toothing of the toothed belt. In this way, the planet carrier is, by means of the planet gears/spur gears mounted rotatably therein and by means of the toothed belt equipped with the front-side and rear-side toothing, supported and guided and thus mounted—self-evidently with a certain degree of play—in the internal gear. At the inside, the planet carrier is connected to a corresponding transmission shaft for example by means of an interference fit.

A toothed belt according to the invention thus runs between the spur gears (the planet gears) and the internal gear, whereby the planetary transmission requires no rim disks arranged laterally with respect to the toothed belt on the toothed-belt pulleys, such that the planetary transmission can accordingly be operated more quietly, with fewer losses and with less wear than conventional planetary transmissions.

A further starting point of the invention is a transmission arrangement which comprises two planetary transmissions, wherein the planetary transmissions are formed as toothed-belt transmissions.

Here, the first toothed-belt pulleys—the spur gears—of the first planetary transmission are, together with the first toothed-belt pulleys—the spur gears—of the second planetary transmission, arranged in each case pairwise on a toothed-belt pulley shaft, wherein the toothed-belt pulley shafts are in each case mounted rotatably in the planet carriers.

Here, the toothed belt is, in each planetary transmission, arranged analogously with respect to the described toothed-belt transmission, which in this case is formed as a planetary transmission, as will be discussed in more detail in the description based on the figures.

In a preferred configuration of the invention, it is provided that the toothed-belt pulleys and the toothed belt of the first planetary transmission have a different diameter and/or a different pitch than the toothed-belt pulleys and the toothed belt of the second planetary transmission. By means of the different diameters, it is possible in particular to realize desired transmission ratios.

In a preferred configuration of the invention, it is furthermore provided that the toothed belt and the toothed-belt pulleys of the first planetary transmission have an opposite helix angle in relation to the helix angle of the toothed belt, and accordingly the toothed-belt pulleys, of the second planetary transmission. As already discussed, the helix angle is defined by the orientation of the tooth flanks in relation to the axial direction.

The opposite orientation of the obliquity of the toothings of the two coupled-together planetary transmissions ensures that it is also the case that the transverse forces that act on the toothed-belt pulleys coupled in pairwise fashion by means of the toothed-belt pulley shafts cancel one another out.

Thus, the shaft bearings, arranged in the planet carrier, of the toothed-belt pulley shaft are advantageously subject to scarcely any loading in an axial direction.

Owing to the opposite orientation of the obliquity of the toothings of the two coupled-together planetary transmissions, use is accordingly made of different toothed belts.

In a preferred configuration of the invention, it is provided that the transmission arrangements according to the invention are arranged in a steering transmission, in a servo steering transmission or in a differential transmission, or are used as such.

The areas of use are widely varied here, wherein, in particular, transmissions with transmission ratios of 10<i<100 constitute a field of use for the transmission arrangements according to the invention.

The transmissions according to the invention can advantageously be operated quietly, with few losses and with little wear and also with little play.

Figure 3:
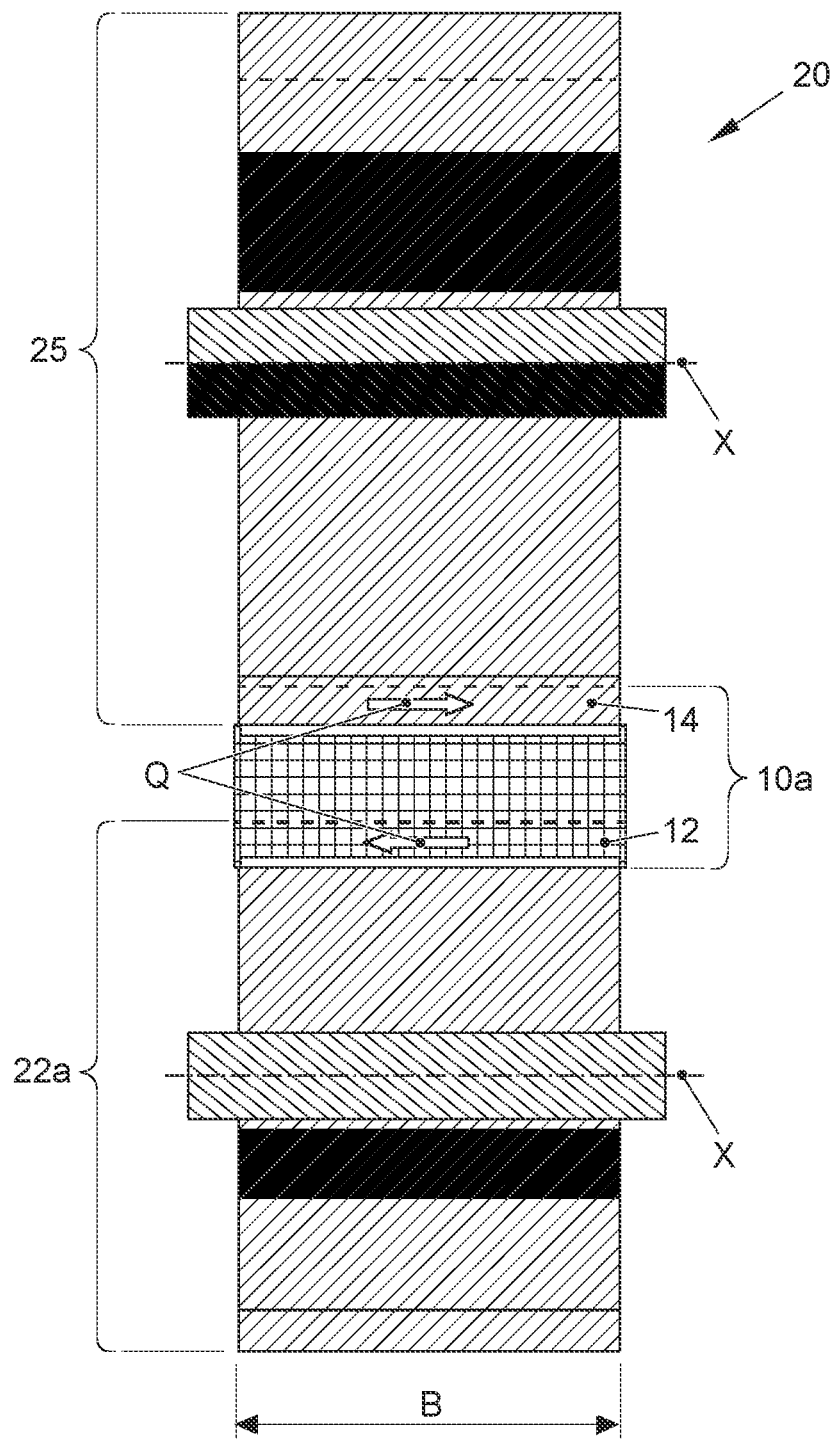
Figure 4:
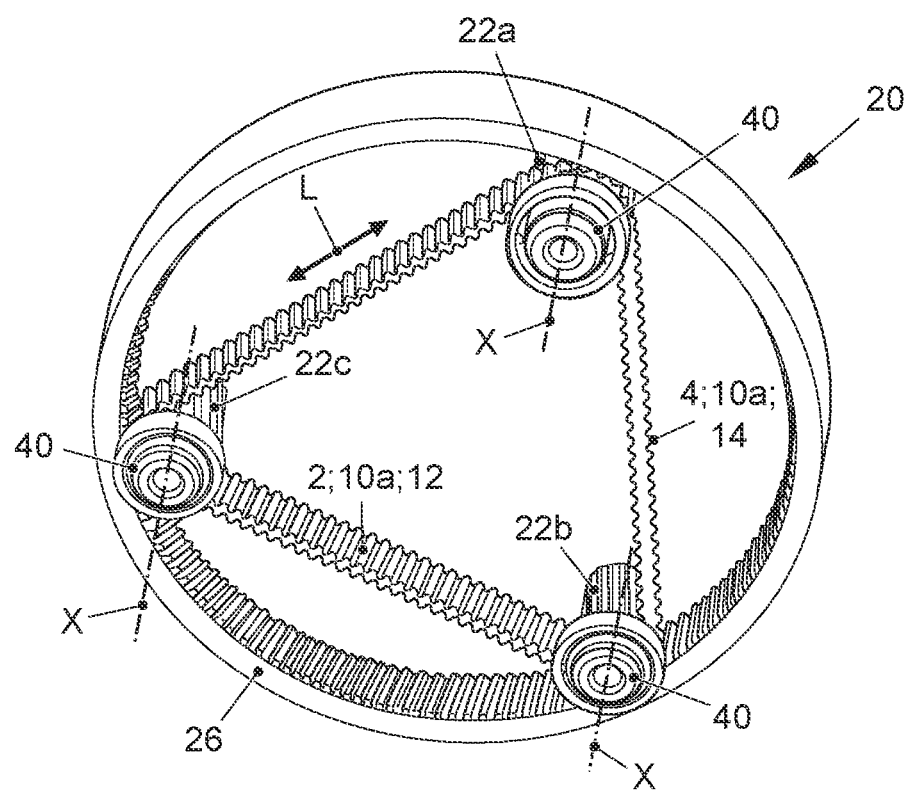
Figure 5:
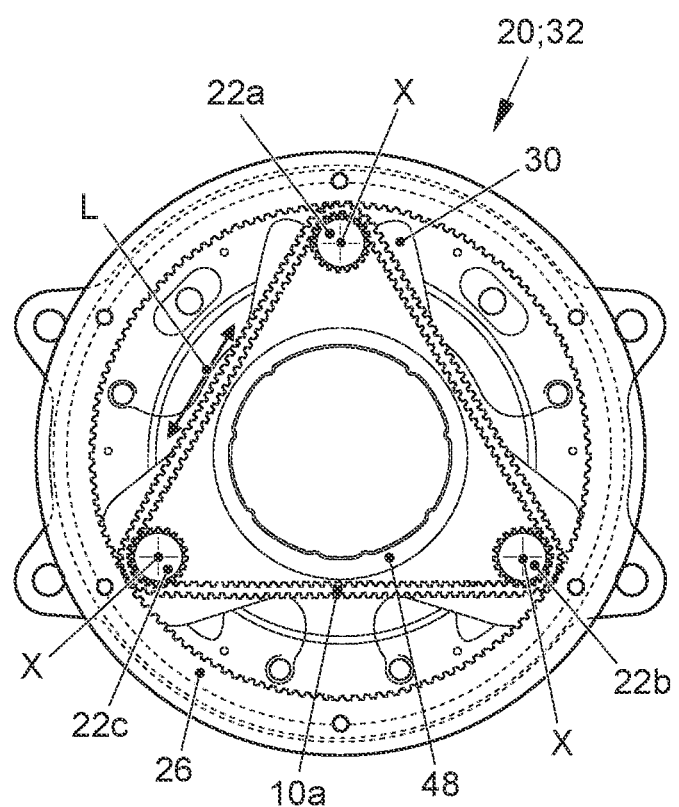
Figure 6:
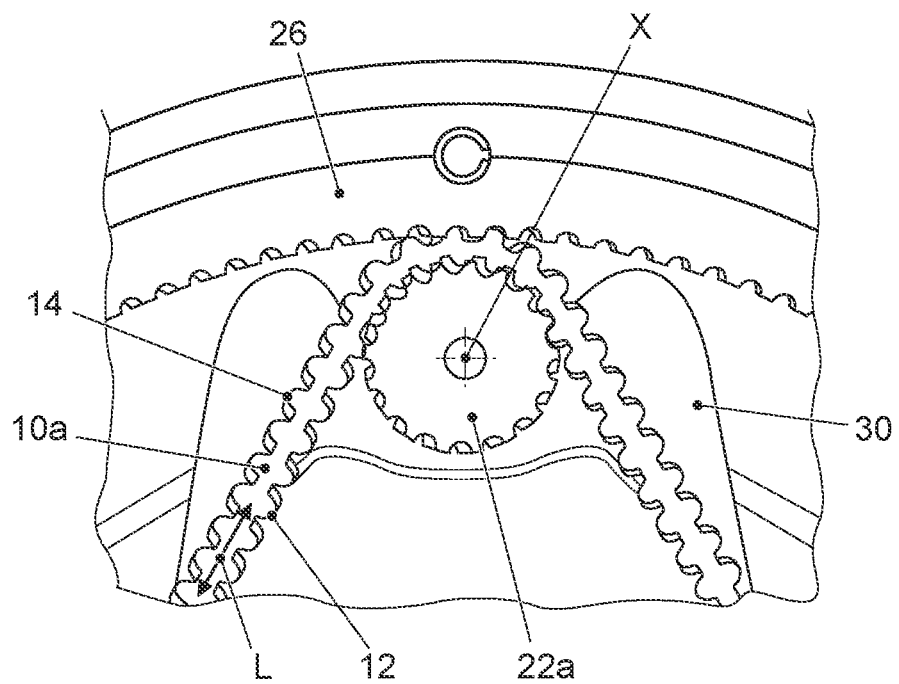
Figure 7:
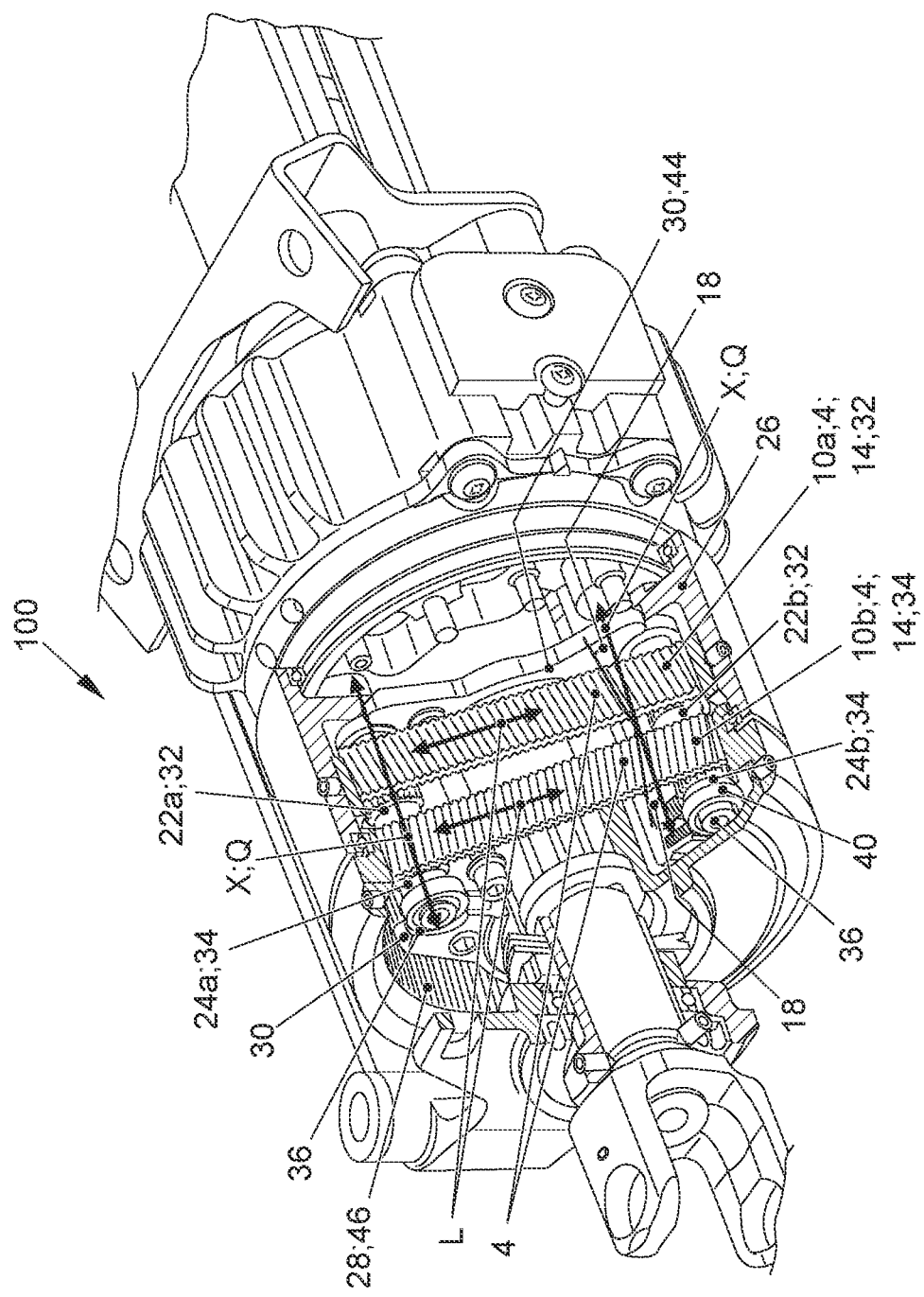
Figure 8:
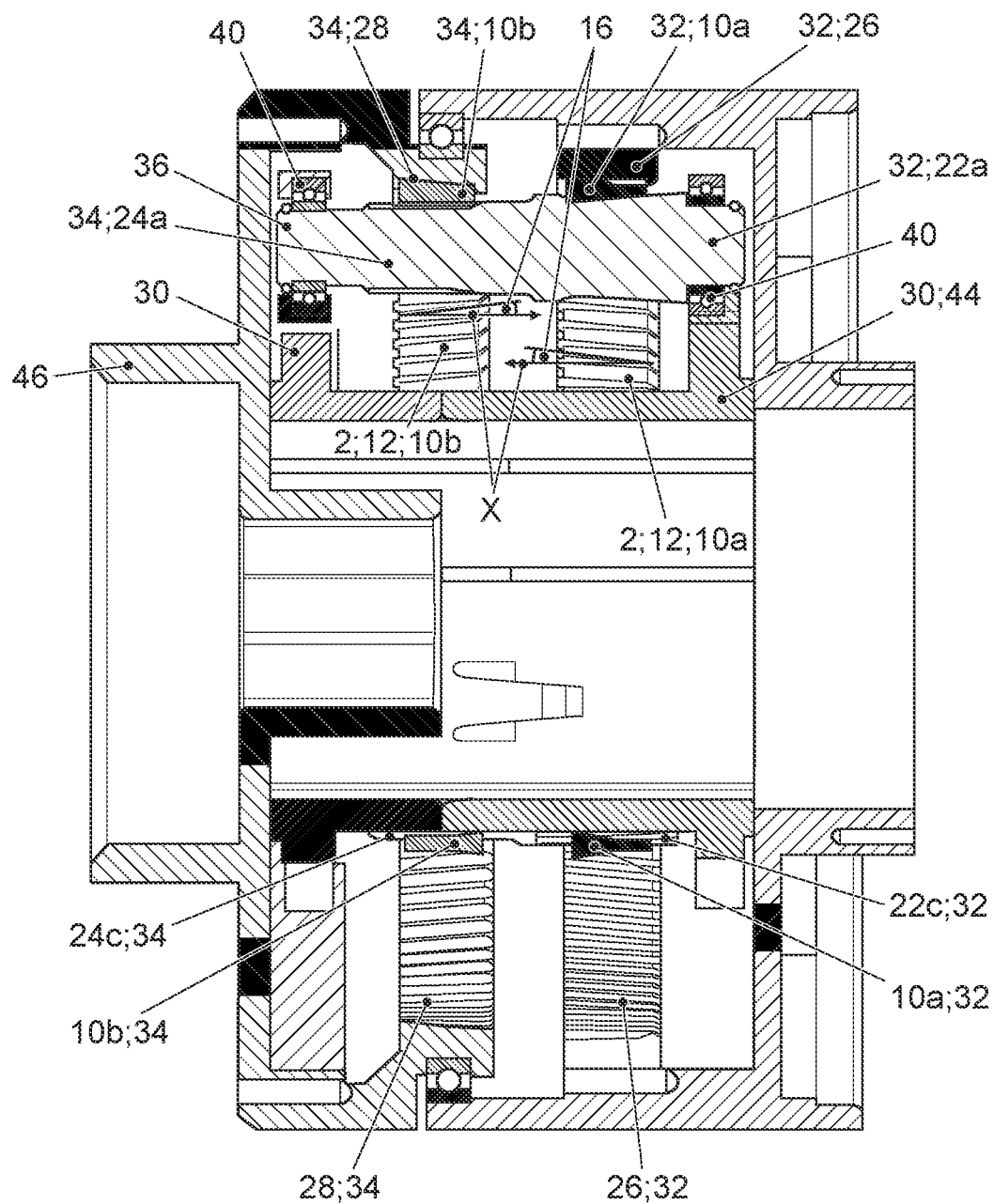
Figure 9:
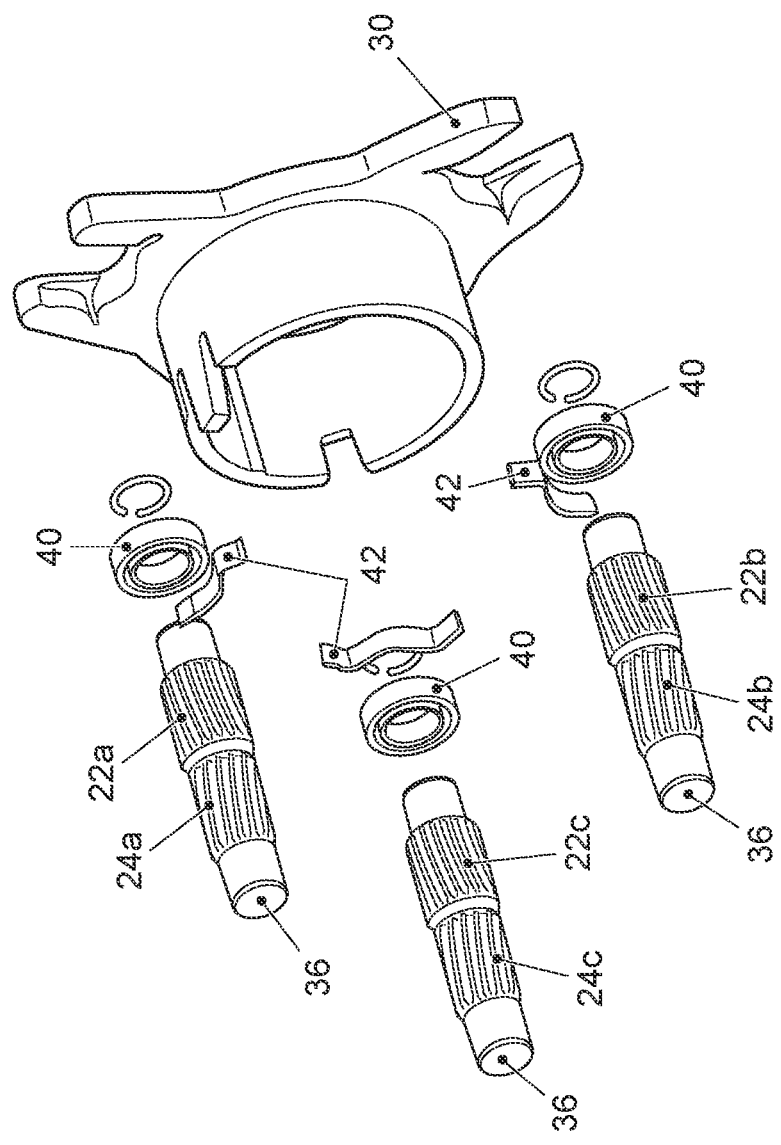

The invention will be discussed below in exemplary embodiments on the basis of the associated drawings, in which:

FIG. 1 shows a toothed belt in a perspective illustration with two mutually oppositely arranged toothings, FIG. 2 shows a detail of a toothed belt with two mutually oppositely arranged toothings in a view from the first, inner toothing, FIG. 3 shows a longitudinal section through a toothed-belt transmission with a toothed belt and with a first toothed-belt pulley and a second toothed-belt pulley, FIG. 4 shows a toothed-belt transmission in a perspective illustration, having three first toothed-belt pulleys which are in engagement with the first, inner toothing of the toothed belt and having a second toothed-belt pulley which is in the form of an internal gear and which is in engagement with the second, outer toothing of the toothed belt, FIG. 5 shows a toothed-belt transmission in the form of a planetary transmission, having three first toothed-belt pulleys and one second toothed-belt pulley in the form of an internal gear, which toothed-belt pulleys are in engagement with the inner toothing and outer toothing, respectively, of the toothed belt, wherein the three first toothed-belt pulleys are arranged positionally fixedly relative to one another in a planet carrier, FIG. 6 is a detail illustration from FIG. 5 with a first toothed-belt pulley, with a second toothed-belt pulley in the form of an internal gear, and with a toothed belt, FIG. 7 shows a transmission arrangement, comprising two planetary transmissions as per FIG. 5, in a perspective illustration, FIG. 8 shows a transmission arrangement, comprising two planetary transmissions as per FIG. 5, in a sectional illustration, and FIG. 9 shows a transmission arrangement formed with two planetary transmissions as per FIG. 5, with in each case three first toothed-belt pulley pairs, arranged in in each case one planet carrier, in an exploded illustration.

FIG. 1 shows a toothed belt 10a with two mutually oppositely arranged toothings 12, 14 in a perspective illustration. Here, the toothings 12, 14 are arranged on the two mutually oppositely arranged running surfaces 2, 4 of the toothed belt 10a.

The first toothing 12 of the toothed belt 10a is in engagement with the external toothing of a first toothed-belt pulley (not illustrated), which is arranged below the toothed belt 10a. The second toothing 14 of the toothed belt 10a is in turn in engagement with the toothing of a second toothed-belt pulley (not illustrated) which is arranged above the toothed belt 10a and which, in FIG. 3, is formed as a spur gear and, in FIGS. 4 to 8, is formed as an internal gear, as will be discussed below.

Accordingly, the first toothing 12 of the toothed belt 10a corresponds with a toothing of the first toothed-belt pulley and the second toothing 14 of the toothed belt 10a corresponds with a toothing of the second toothed-belt pulley.

The advantage of the helical toothing in transmissions, as is also the case here in toothed-belt transmissions, consists in that increased running smoothness is attained, and accordingly the noise emissions of the transmission are reduced. The toothed-belt transmission furthermore allows play-free transmission.

Owing to the oppositely oriented obliquities of the two mutually oppositely arranged toothings 12, 14, the transverse forces Q (see also FIG. 2) acting in an axial direction X on the toothed belt 10a advantageously cancel one another out.

The oppositely acting transverse forces Q result from the oppositely oblique tooth flanks of the teeth of the toothed belt 10a with respect to the axial direction X, wherein the axial direction X is oriented orthogonally with respect to the running direction L of the toothed belt 10a.

Thus, the toothed belt 10a is not moved in the axial direction X during operation, as occurs in the case of an identically oriented obliquity of toothed belts 10a that are toothed on both sides, in the case of which the tooth flanks of the teeth of the toothed belt 10a are not oppositely oblique with respect to the axial direction X of the toothed belt 10a.

It is thus advantageously the case that no rim disks arranged laterally with respect to the toothed belt 10a on the toothed-belt pulleys are required for preventing the migration of the toothed belt 10a in the axial direction X. It is thus the case that rim disks are not illustrated in any of the figures.

Accordingly, there is advantageously also no wear of the toothed belt 10a against the rim disks, such as would otherwise occur. The friction and thus the mechanical losses are also advantageously reduced by means of the solution provided. It is thus also possible for the transmission temperatures to be reduced, and accordingly for the thermal loads on the components of the associated transmission to be reduced. It may thus also be the case that a cooling arrangement of the transmission can be omitted or dimensioned to be smaller.

FIG. 2 shows the toothed belt 10a illustrated in FIG. 1 from the side which is assigned to the first running surface 2 of the first toothing 12.

Arranged opposite the first toothing 12 is the second toothing 14, which is not visible in FIG. 2.

The helix angle 16 of the second toothing 14 is, in relation to the axial direction X, oriented oppositely to the helix angle 18 of the first toothing 12.

In the case of an equal magnitude of the two helix angles 16, 18, as is provided, the helix angle 18 of the second toothing 14 arises from a "mirroring" of the helix angle 16 of the first toothing 12 about imaginary mirror axes, which are oriented either in the X direction X or else oriented with the running direction L.

The mirroring about an imaginary mirror axis in the running direction L as per FIG. 2 becomes clear if one shifts the L axis lying outside the toothed belt to one of the points of intersection of the two helix angles 16, 18.

In the case of equal forces on both toothings 12, 14, the transverse forces Q, acting in the axial direction X, of the two toothings 12, 14 cancel one another out. Here, the transverse forces Q result from the obliquity of the tooth flanks of the toothings 12, 14 in relation to the axial direction X, oriented orthogonally with respect to the running direction L, of the toothed belt 10a.

FIG. 3 illustrates a longitudinal section through a toothed-belt transmission 20 with a toothed belt 10a known from FIGS. 1 and 2 and with a first toothed-belt pulley 22a and a second toothed-belt pulley 25.

Here, both toothed-belt pulleys 22a, 25 have an external toothing.

The first toothed-belt pulley 22a is arranged opposite the second toothed-belt pulley 25, wherein the toothed belt 10a runs between the two toothed-belt pulleys 22a, 25 formed as spur gears 22a, 25.

The toothed belt 10a is equipped with the first toothing 12 and the second toothing 14, wherein the first toothing 12 is in engagement with the toothing of the first toothed-belt pulley 22a, and the second toothing 14 is in engagement with the toothing of the second toothed-belt pulley 25.

Owing to the oblique profile of the toothings 12, 14 of the toothed belt 10a, these are only partly visible in the section, and are partly concealed by the toothings of the two toothed-belt pulleys 22a, 25.

The transmission of the torques between first toothed-belt pulley 22a and second toothed-belt pulley 25 is performed by the toothed belt 10a. Here, the toothed belt 10a is not subject to tensile load, and thus advantageously has a damping action between the first toothed-belt pulley 22a and the second toothed-belt pulley 25. Furthermore, with this arrangement, a play-free toothed-belt transmission 20 is realized. The noise emissions of the toothed-belt transmission 20 are thus advantageously considerably reduced.

The first toothing 12 and the second toothing 14 have an oppositely oriented helix angle, such that the transverse forces Q, which act in the axial direction X, owing to the tooth flanks, which run obliquely with respect to the axial direction X, of the toothed belt 10a and of the toothed-belt pulleys 22a, 25 cancel one another out.

There is thus no need for lateral guidance of the toothed belt 10a, for example by means of rim disks (not illustrated) arranged laterally on the toothed-belt pulleys 22a, 25.

The omission of the rim disks also has the advantage in particular that the assembly of a toothed-belt transmission 20, 32, 34 (see FIGS. 4 to 6) or of a transmission arrangement 100 (see FIGS. 7 to 9), which will be discussed in more detail further below, is made easier, in particular because it is easier to carry out the arrangement of the toothed belt 10a in the toothed-belt transmission 20, 32, 34, or of the toothed belt 10a, 10b in the transmission arrangement 100 discussed by way of example, on the toothed-belt pulleys 22a, 22b, 22c; 24a, 24b, 24c.

FIG. 4 shows, in a perspective illustration, a toothed-belt transmission 20 with three first toothed-belt pulleys 22a, 22b, 22c, which are in engagement with the first, inner toothing 12 of the toothed belt 10a, and with one second toothed-belt pulley 26, which is formed as an internal gear 26 and which is in engagement with the second, outer toothing 14 of the toothed belt 10a.

Here, the toothings of the three first toothed-belt pulleys 22a, 22b, 22c are in each case arranged directly opposite the toothing of the second toothed-belt pulley 26, such that the forces from the internally situated first toothed-belt pulleys 22a, 22b, 22c are transmitted via the first toothing 12 and the second toothing 14 of the toothed belt 10a to the second toothed-belt pulley 26.

Here, the toothed belt 10a is not subject to tensile load, and in particular has a damping action between the first toothed-belt pulleys 22a, 22b, 22c and the second toothed-belt pulley 26. By means of the toothed belt 10a, the transmission can advantageously be realized without play.

The illustrated toothed-belt transmission 20 is based on the toothed belt 10a shown in FIG. 1 and FIG. 2 with oppositely oriented helix angles of the first 12 and second toothing 14. Accordingly, the advantages of the toothed belt 10a also apply to the illustrated toothed-belt transmission 20.

FIGS. 5 and 6 show the toothed-belt transmission 20 illustrated in FIG. 4, wherein FIG. 6 shows a detail illustration from FIG. 5. The toothed-belt transmission 20 comprises the three first toothed-belt pulleys 22a, 22b, 22c and the second toothed-belt pulley 26 formed as an internal gear 26, which toothed-belt pulleys are in each case in engagement with the internal toothing 12 and the external toothing 14, respectively, of the toothed belt 10a.

Here, the three first toothed-belt pulleys 22a, 22b, 22c are rotatably mounted by means of a toothed-belt shaft 36 in a planet carrier 30, and are thus arranged in a positionally fixed manner relative to one another. Accordingly, this toothed-belt transmission 20 is formed as a planetary transmission 32. The force is transmitted from the three first toothed-belt pulleys 22a, 22b, 22c by means of the first toothing 12 and the second toothing 14 of the toothed belt 10a to the second toothed-belt pulley 26. The above-mentioned advantages therefore apply to the illustrated planetary transmission.

Here, it may preferably be provided that the spacing between the first toothed-belt pulleys 22a, 22b, 22c and the second toothed-belt pulley 26 is smaller than the thickness of the toothed belt 10a.

Correspondingly, the intermediate space between the first toothed-belt pulleys 22a, 22b, 22c and the second toothed-belt pulley 26 have an undersize in relation to the toothed belt 10a arranged in between.

The elastic toothed belt 10a is thus compressed. A contact pressure is thus attained which reduces the noise emissions and the wear of the toothed-belt transmission 40 yet further.

In FIG. 6, it is in particular also possible to see the helical toothing of toothed belt 10a and first toothed-belt pulley 22a and second toothed-belt pulley 26.

FIG. 7 illustrates a further preferred design variant, which shows, in a perspective illustration, a transmission arrangement 100 which comprises two planetary transmissions 32, 34.

These planetary transmissions 32, 34 have already been shown and described in conjunction with FIGS. 5 and 6.

FIG. 8 shows the transmission arrangement 100 illustrated in FIG. 7 in a longitudinal sectional illustration.

Here, the planetary transmissions 32, 34 are preferably integrated into a transmission arrangement 100 formed as a steering transmission.

In one possible embodiment, a transmission arrangement 100 is formed which comprises two toothed-belt transmissions 32, 34 which, as already discussed, are formed as planetary transmissions 32, 34.

The first toothed-belt pulleys 22a, 22b, 22c of the first planetary transmission 32 with the first toothed-belt pulleys 24a, 24b, 24c of the second planetary transmission 34 are arranged in each case pairwise on in each case one shaft 36 rotatably in the planet carriers 30.

The drive 44 (see FIGS. 7 and 8 viewed together) of the shafts 36 and of the toothed-belt pulleys 22a, 22b, 22c; 24a, 24b, 24c arranged on the shafts 36 is performed via the rotatable planet carriers 30.

It is provided here that a second toothed-belt pulley 26, formed as an internal gear, of the first planetary transmission 32 is arranged so as to be static, and a second toothed-belt pulley 28, likewise formed as an internal gear, of the second planetary transmission 34 is arranged so as to be rotatable relative to the second toothed-belt pulley 26 of the first planetary transmission 32.

The second toothed-belt pulley 28 of the second planetary transmission 34 forms the output 46 of the transmission arrangement 100, wherein the second toothed-belt pulley 28 is operatively connected to a steering-wheel-side shaft (not illustrated).

According to the invention, it is furthermore provided that the toothed belts 10A, 10B according to the invention are arranged as damping elements between the first toothed-belt pulleys 22a, 22b, 22c; 24a, 24b, 24c and the second toothed-belt pulleys 26, 28.

By means of the first toothed-belt pulleys 22a, 22b, 22c, situated and thus connected pairwise on a toothed-belt pulley shaft 36, of the first planetary transmission 32 with the first toothed-belt pulleys 24a, 24b, 24c of a second planetary transmission 34, both planetary transmissions 32, 34 are driven by means of the drive 44.

In other words, the pairwise connection of the first toothed-belt pulleys 22a, 22b, 22c of the first planetary transmission 32 to the first toothed-belt pulleys 24a, 24b, 24c of the second planetary transmission 34 is realized in each case by the arrangement of the toothed-belt pulleys 22a, 22b, 22c; 24a, 24b, 24c on three toothed-belt pulley shafts 36, wherein the three toothed-belt pulley shafts 36 are mounted by means of bearings 40 at both sides in the planet carriers 30.

The two planet carriers 30, which are of disk-like form, are fixedly attached by way of their arms at both sides to a hollow shaft 48 (see FIG. 5) which is driven at the motor side, such that the hollow shaft 48 sets the planet carriers in rotation.

The above-mentioned advantageous effects of the mutually oppositely oriented helix angles 16 of the first toothing 12 on the inner side in relation to the helix angle 18 of the second toothing 14 on the outer side of the toothed belts 10a, 10b as damping elements are analogously also attained in the case of this transmission arrangement 100.

Furthermore, the first toothed-belt pulleys 22a-24a, 22b-24b, 22c-24c arranged pairwise on a shaft 36 are toothed with opposite orientation, whereby, with the arrangement of two toothed belts 10A, 10B, the effect is realized that the transverse forces Q acting in the axial direction X on the toothed belts 10a, 10b cancel one another out.

Accordingly, it is also the case that no transverse forces Q act on the toothed-belt pulley pairs 22a-24a, 22b-24b, 22c-24c. The axial load on the bearings 40 and on the planet carriers 30 is thus advantageously considerably reduced.

Owing to the opposite orientation of the obliquity of the toothings of the two coupled-together planetary transmissions 32, 34, use is accordingly made of different toothed belts, as illustrated in the figures.

For illustrative purposes, FIG. 9 shows individual components of the transmission arrangement 100, specifically the toothed-belt pulley pairs 22a-24a, 22b-24b, 22c-24c of the two planetary transmissions 32, 34, as per FIGS. 5 to 8 viewed together, in an exploded illustration.

It is illustrated in particular that the first toothed-belt pulleys 22a, 22b, 22c of the first planetary transmission 32 have a larger diameter than the first toothed-belt pulleys 24a, 24b, 24c of the second planetary transmission 34.

In each case two first toothed-belt pulleys 22a-24a, 22b-24b, 22c-24c are arranged pairwise on a shaft 36, wherein these are arranged by means of bearings 40 and suitable fastening elements 42 in the planet carriers 30.

With the different diameters and/or different toothing pitch of the first toothed-belt pulleys 22a, 22b, 22c of the first planetary transmission 32 in relation to the first toothed-belt pulleys 24a, 24b, 24c of the second planetary transmission 34, it is possible here for the transmission ratio of the transmission arrangement 100, in particular of a steering transmission, to be predefined.

LIST OF REFERENCE DESIGNATIONS

10a First toothed belt
10b Second toothed belt
2 First running surface of the toothed belt
4 Second running surface of the toothed belt
12 First toothing, inner toothing
14 Second toothing, outer toothing
16 Helix angle of the first toothing
18 Helix angle of the second toothing
20 Toothed-belt transmission
22a, 22b, 22c First toothed-belt pulley with external toothing (spur gear) in internal gear 26
24a, 24b, 24c First toothed-belt pulley with external toothing (spur gear) in internal gear 28
25 Second toothed-belt pulley with external toothing (spur gear)
26 Second toothed-belt pulley with internal toothing (fixed internal gear)
28 Second toothed-belt pulley with internal toothing (rotating internal gear)
30 Planet carrier
32 First planetary transmission, toothed-belt transmission
34 Second planetary transmission, toothed-belt transmission
36 Shaft, toothed-belt pulley shaft
40 Bearing
42 Fastening element
44 Drive
46 Output
48 Drive shaft
100 Transmission arrangement
X Axial direction
L Running direction
Q Transverse force
B Toothed-belt width
Z Tooth spacing

The invention claimed is:

1. A toothed belt comprising;
two mutually oppositely arranged running surfaces, wherein, on the running surfaces there are arranged teeth arranged obliquely with respect to the axial direction (X), wherein the obliquity is defined in each case by helix angles between the axial direction (X) and the direction of the tooth flanks of the respective teeth, and wherein a first helix angle of a first toothing is oriented opposite to a second helix angle of a second toothing;
at least one first toothed-belt pulley, which is in engagement with the first toothing of the toothed belt, and at least one second toothed-belt pulley, which is in engagement with the second toothing of the toothed belt, and wherein a helix angle of the toothing of the toothed-belt pulleys in each case corresponds to the helix angle of the teeth of the toothed belt;
the at least one second toothed-belt pulley is arranged so as to be situated directly opposite the at least one first toothed-belt pulley; and
the spacing between the at least one first toothed-belt pulley and the at least one second toothed-belt pulley is smaller than the thickness of the toothed belt arranged between the at least one first toothed-belt pulley and the at least one second toothed-belt pulley.

2. The toothed belt as claimed in claim 1, wherein the first helix angle of the first toothing and the second helix angle of the second toothing have an equal or different magnitude of helix angle.

3. The toothed belt as claimed in claim 2, wherein the first helix angle and the second helix angle each have an angle value between >0 degrees and 20 degrees.

4. The toothed belt as claimed in claim 3 wherein the first helix angle and the second helix angle each have an angle value of from 2 degrees to 10 degrees.

5. The toothed belt as claimed in claim 4, wherein the first helix angle and the second helix angle each have an angle value of 5 degrees.

6. The toothed belt as claimed in claim 1, wherein the teeth of the toothed belt are of similar or non-similar design in particular with regard to tooth height, tooth pitch (tooth spacing Z) and tooth shape.

7. The toothed-belt transmission as claimed in claim 1, wherein the at least one first toothed-belt pulley has an external toothing and the at least one second toothed-belt pulley as an internal gear has an internal toothing, wherein respective helix angle of the teeth of the respective toothed-belt pulley corresponds to the helix angle of the respective toothing of the toothed belt which engages into the teeth of the respective toothed-belt pulley.

8. The toothed-belt transmission as claimed in claim 7, wherein the first toothed-belt pulleys are arranged rotatably in planet carriers of a planetary transmission relative to one another, and wherein the planet carriers with the first toothed-belt pulleys are arranged in the second toothed-belt pulleys designed as internal gears and are thus formed as planetary transmissions.

9. A toothed belt comprising:
two mutually oppositely arranged running surfaces, wherein, on the running surfaces there are arranged teeth arranged obliquely with respect to the axial direction (X), wherein the obliquity is defined in each case by helix angles between the axial direction (X) and the direction of the tooth flanks of the respective teeth, and wherein a first helix angle of a first toothing is oriented opposite to a second helix angle of a second toothing;
at least one first toothed-belt pulley, which is in engagement with the first toothing of the toothed belt, and at least one second toothed-belt pulley, which is in engagement with the second toothing of the toothed belt, and wherein a helix angle of the toothing of the toothed-belt pulleys in each case corresponds to the helix angle of the teeth of the toothed belt;
a transmission arrangement comprising at least the toothed belt and having two planetary transmissions, wherein the first toothed-belt pulleys of the first planetary transmission are, with the first toothed-belt pulleys of the second planetary transmission, arranged in each case pairwise on a shaft rotatably in the planet carriers, and the drive of the shafts and of the toothed-belt pulleys arranged on the shafts is performed via the rotatable planet carriers, wherein a second toothed-belt pulley of the first planetary transmission is arranged so as to be static, and a second toothed-belt pulley of the second planetary transmission is arranged so as to be rotatable relative to the second toothed-belt pulley of the first planetary transmission, wherein the second rotatable toothed-belt pulley of the second planetary transmission forms the output of the transmission arrangement, and wherein the toothed belts are arranged as damping elements between the first toothed-belt pulleys and the second toothed-belt pulleys.

10. The transmission arrangement as claimed in claim 9, wherein the first toothed-belt pulleys of the first planetary transmission and, correspondingly thereto, the toothing of the second toothed-belt pulley have a different diameter and/or a different tooth pitch than the first toothed-belt pulleys of the second planetary transmission and the corresponding toothing of the second toothed-belt pulley, whereby a transmission ratio of the transmission arrangement between the drive and the output is adjustable.

11. The transmission arrangement as claimed in claim 9, wherein the toothed belt and the toothed-belt pulleys of the first planetary transmission have an opposite helix angle in relation to the helix angle of the toothed belt of the toothed-belt pulleys of the second planetary transmission.

12. The use of a transmission arrangement as claimed in claim 9 as a steering transmission, a servo steering transmission, a differential transmission, or a force feedback actuator of a steer-by-wire steering system.

\* \* \* \* \*